US008454155B1

(12) United States Patent
Ho (10) Patent No.: US 8,454,155 B1
(45) Date of Patent: Jun. 4, 2013

(54) EYEWEAR

(76) Inventor: Patrick C. Ho, Hilton, NY (US)

( * ) Notice: Subject to any disclaimer, the term of this patent is extended or adjusted under 35 U.S.C. 154(b) by 198 days.

(21) Appl. No.: 12/804,850

(22) Filed: Jul. 30, 2010

(51) Int. Cl.
*G02C 5/06* (2006.01)

(52) U.S. Cl.
CPC .................................. *G02C 5/06* (2013.01)
USPC ............ 351/126; 351/114; 351/125; 351/130

(58) Field of Classification Search
USPC ............. 351/41, 43, 103–109, 111–135, 158; 2/209.13
See application file for complete search history.

(56) References Cited

U.S. PATENT DOCUMENTS

| | | | |
|---|---|---|---|
| 915,487 A | 3/1909 | Savoie | |
| 1,705,229 A | 3/1929 | Welsh | |
| 1,706,083 A | 3/1929 | Simonds | |
| 1,743,796 A | 1/1930 | Nelson | |
| D89,677 S * | 4/1933 | Belgard | D16/335 |
| 1,952,890 A | 3/1934 | Poeton | |
| 2,194,776 A | 3/1940 | Sweeney | |
| 2,196,872 A | 4/1940 | Pomeranz | |
| 2,250,243 A * | 7/1941 | Williams | 351/106 |
| 2,268,908 A | 1/1942 | Shockey | |
| 2,301,325 A * | 11/1942 | Reiss et al. | 351/109 |
| 2,310,133 A | 2/1943 | Uhlemann et al. | |
| 2,365,163 A | 12/1944 | Alexander | |
| 2,374,171 A | 4/1945 | Breuker, Jr. | |
| 2,388,713 A | 11/1945 | Schutz et al. | |
| 2,396,207 A | 3/1946 | Schutz et al. | |
| 2,564,961 A | 8/1951 | Culver et al. | |
| D164,889 S | 10/1951 | Weissman | |
| 2,905,172 A | 9/1959 | Rodenhouse | |
| 2,962,722 A | 12/1960 | Curran | |
| 2,993,209 A * | 7/1961 | Monahan, Jr. et al. | 2/428 |
| 3,146,295 A | 8/1964 | Roland | |
| 3,182,658 A | 5/1965 | Klinger | |
| 3,288,547 A | 11/1966 | Klinger et al. | |
| 3,563,640 A | 2/1971 | Wise et al. | |
| 3,944,344 A | 3/1976 | Wichers | |
| 4,023,214 A | 5/1977 | Waldherr | |
| 4,105,026 A | 8/1978 | Hay, II | |
| 4,129,362 A | 12/1978 | Lorenzo | |
| 4,391,498 A | 7/1983 | Rengstorff | |
| 4,488,792 A | 12/1984 | Wagner | |
| 4,711,539 A | 12/1987 | Krusas et al. | |
| 4,723,844 A | 2/1988 | Medina | |
| 4,810,080 A | 3/1989 | Grendol et al. | |

(Continued)

*Primary Examiner* — Huy K Mai
(74) *Attorney, Agent, or Firm* — Kenneth J. Lukacher Law Group (57) ABSTRACT

Eyewear which is suitable for routine wear and within masks which are sealed against noxious environmental gases or penetration by water is provided by a frame made up of resilient metal parts including wires to provide the frame with a shape, which facilitates the placement of the eyewear on the head of the user while limiting the movement of the eyewear when in use so as to avoid breaking the seal of a mask inside of which the eyewear is disposed when the mask is donned by the user. The eyewear has a lens holding frame for holding lenses adjacent the eyes of the user's head and connected by a bridge across the user's nose. Flexible members bent arcuately around and in conformance with the sides of the head of the user have a kink whereby to facilitate acceptance between the sides of the head and the seal of the mask with sufficient tightness against the side of the head to limit movement of the frame and the space between the seal and the head thereby avoiding breaking of the seal when the mask is in operation.

14 Claims, 11 Drawing Sheets

U.S. PATENT DOCUMENTS

| | | |
|---|---|---|
| 4,930,163 A | 6/1990 | King |
| 4,965,887 A | 10/1990 | Paoluccio et al. |
| D351,396 S | 10/1994 | Conway |
| 5,367,344 A * | 11/1994 | Fuchs ............................. 351/41 |
| D367,876 S | 3/1996 | Rabut |
| D371,568 S | 7/1996 | Nakabayashi |
| D377,803 S | 2/1997 | Wilson |
| D379,191 S | 5/1997 | Flanagan |
| D381,671 S | 7/1997 | Tan et al. |
| 5,666,181 A | 9/1997 | Conway |
| D392,305 S | 3/1998 | Peschel et al. |
| D392,306 S | 3/1998 | Arnette |
| D399,242 S | 10/1998 | Raub |
| D405,818 S | 2/1999 | De Bruyn |
| D410,940 S | 6/1999 | Raub |
| D411,223 S | 6/1999 | Simioni |
| 6,000,795 A | 12/1999 | Van Rysselberghe |
| 6,019,468 A | 2/2000 | Altemare, Jr. |
| D422,014 S | 3/2000 | Simioni et al. |
| D426,848 S | 6/2000 | Hartman |
| D434,790 S | 12/2000 | Lepeu et al. |
| D443,633 S | 6/2001 | Lazarides |
| 6,511,174 B1 | 1/2003 | Rossin |
| 6,591,459 B2 | 7/2003 | Muller et al. |
| D482,384 S | 11/2003 | Frederik Anton Thiele et al. |
| 6,719,425 B2 | 4/2004 | Conner |
| 6,886,934 B2 | 5/2005 | Asman et al. |
| 6,902,636 B2 | 6/2005 | Jee |
| D523,061 S | 6/2006 | Asman et al. |
| D539,834 S | 4/2007 | Hester |
| D546,368 S | 7/2007 | Park |
| D556,819 S | 12/2007 | Fuchs |
| 7,347,544 B1 | 3/2008 | McLaughlin |
| 7,494,218 B1 | 2/2009 | Rotella |
| 7,677,724 B1 | 3/2010 | Erickson et al. |
| 7,703,914 B2 | 4/2010 | Maling |

\* cited by examiner

EYEWEAR

FIELD OF THE INVENTION

The present invention relates to eyewear, and particularly to eyewear which is suitable for routine use as well as within a mask without interfering with the operation of a mask, particularly the seal holding the mask against the skin of the head of the user.

Eyewear in accordance with the present invention is made up of a combination of parts of such shape as to provide resiliency to facilitate the putting on of the eyewear, comfort in wearing the eyewear, presenting a pleasing appearance by the eyewear, and enabling the eyewear to be used within a mask, such as an emergency air breathing mask, a gas mask, or a scuba mask, without interference with the donning of the mask or the seal which prevents the noxious substances, such as gas or water from penetrating the mask by breaking the seal.

BACKGROUND OF THE INVENTION

Prescription eyewear to be used within masks without interfering with the functioning of the mask has been a source of difficulty and the subject of many design attempts over the years. For the most part, these attempts have sought to assemble an eyeglass frame inside the mask as a part of the mask. See, for example, Schutz et al., U.S. Pat. No. 2,388,713 of Nov. 13, 1945; Rodenhouse, U.S. Pat. No. 2,905,172 of Sep. 22, 1959; Waldherr, U.S. Pat. No. 4,023,214 of May 17, 1977 and Erickson et al., U.S. Pat. No. 7,677,724 of Mar. 16, 2010. Routine use of frame designs for incorporation in masks is not achievable with these designs. By routine use is meant wearing of the prescription eyewear for general purposes. For example, the eyewear may be routinely used with other optical devices such as inside the eyepiece of such devices as in the case of periscopes.

The term eyewear as used herein includes frames which may carry lenses, for example, prescription lenses, which can be used within or outside an air breathing mask without interference with the operation of the mask. An air breathing mask enables the wearer to work in noxious gas environments or under water, for example as a scuba mask.

SUMMARY OF THE INVENTION

It is the principal advantage of the present invention that eyewear provided in accordance with the invention may be worn for routine use as well as in an air breathing mask without interference with the operation of the mask as by breaking the seal which prevents the external environment from undesirably penetrating the mask.

Another advantage of the invention is that the eyewear presents a pleasing appearance as well as is comfortable in routine use or within the mask.

Another feature of the invention is that the eyewear provided by the invention is compatible with the donning of the mask and remains in place and does not obstruct the vision of the user when donning the mask over the eyewear.

Other advantages of the invention are that the eyewear provided by the invention is suitable for routine wear as well as within a mask and is compatible with optical devices such as binoculars, periscopes, etc. and enable the eyewear to extend inside the eyepiece of the periscope or other optical device.

The combination of parts which provide eyewear in accordance with the invention uniquely enable effective performance of the eyewear both inside and outside a mask and especially without interference with the operation of a mask.

Briefly described, the present invention provides eyewear wearable on the head of a user inside a mask without interference with the operation thereof. The eyewear has a lens holding frame for holding lenses adjacent the eyes of the user's head and connected by a bridge across the user's nose. Flexible members bent arcuately around and in conformance with the sides of the head of the user have a kink whereby to facilitate acceptance between the sides of the head and the seal of the mask with sufficient tightness against the side of the head to limit movement of the frame and the space between the seal and the head thereby avoiding breaking of the seal when the mask is in operation.

The frame may be provided by resilient metal parts, such parts forming the kink transitioning from wires to flat sections, where the flat sections provide the arcuately bent flexible members.

The flexible members preferably extend inwardly along with the lenses toward the bridge between the lenses and are connected to the bridge via sections having further kinks which enhance the flexibility of the members.

BRIEF DESCRIPTION OF THE DRAWINGS

The foregoing and other objects, features and advantages of the invention will become more apparent from a reading of the following description in connection with the accompanying drawings in which.

DETAILED DESCRIPTION OF THE INVENTION

Figure 8:
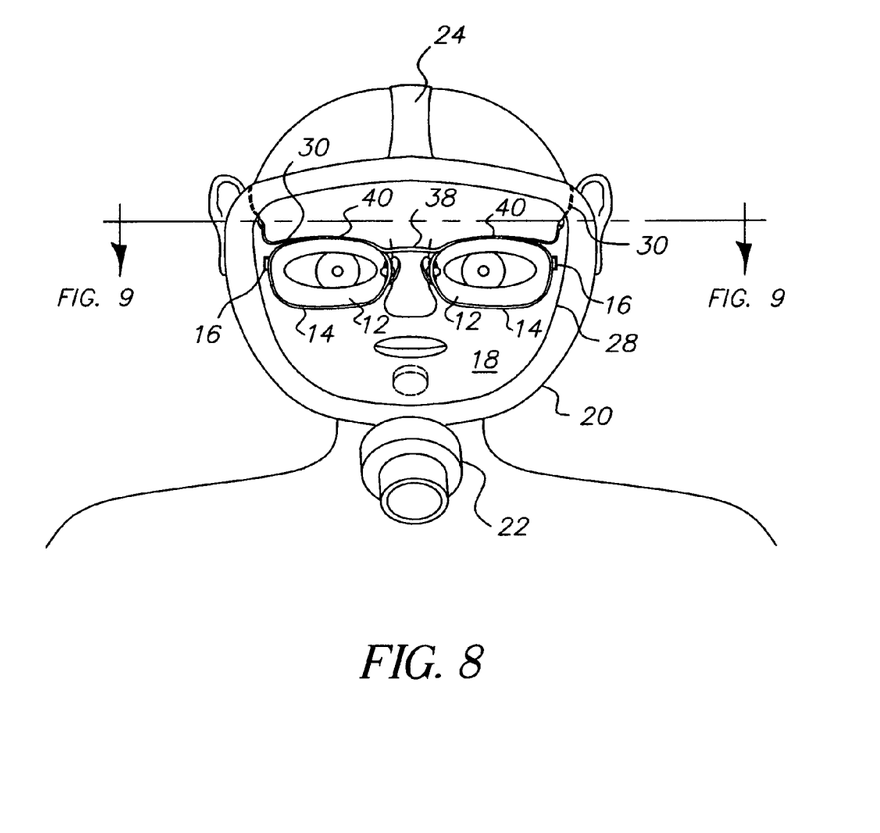
FIG. 8 is a front view showing the eyewear in a mask.
Figure 9:
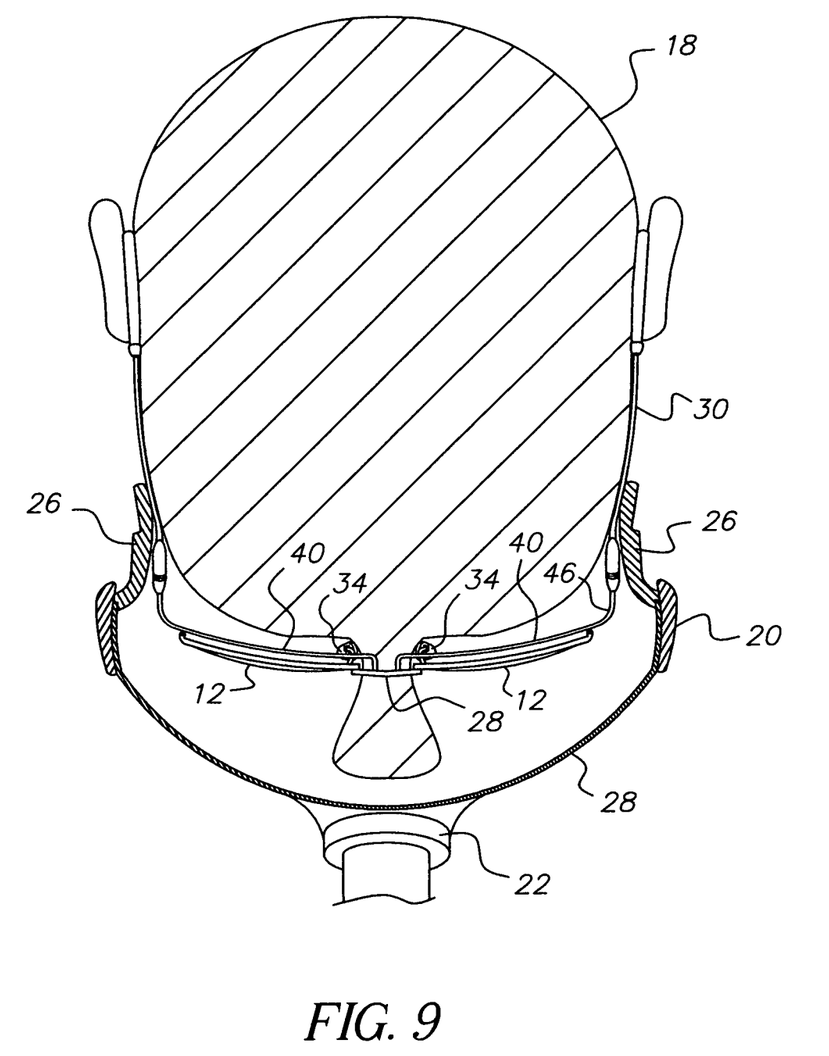
FIG. 9 is a sectional view of the eyewear in the mask, the section being taken along the line 9-9 in FIG. 8.

Referring more particularly to the drawings, an eyewear frame 10 embodying the invention is shown with the lenses 12 captured in lens holding sections 14 of the frame which can be opened and closed to enable installation of the frame by means of screw clamps 16. The lenses 12 and the lens holding sections 14 are disposed adjacent the eyes of the wearer 18 as shown in FIGS. 8 and 9 where the frame 10 is worn by the user inside a mask 20. This mask 20 is an air breathing mask of the type used as a gas mask or for emergency air breathing with fresh air entering the mask through a coupling 22. The frame 10 provided by the invention enables the mask 20 to be donned with ease and without interference with the frame 10.

Straps 24 hold the mask 20 in place while the seal 26 around the visor section 28 of the mask is maintained without breaking the seal by virtue of the construction and design of the frame 10. Although mask 20 is shown as an emergency air breathing mask, the eyewear frame 10 may be worn with other masks, such as a scuba mask having seals along the right and left sides of the user head, e.g., at or near the temples. The eyewear frame is shown in more detail in FIGS. 1-7.

The alignment and position of the lens sections 14 of the frame 10 is maintained by a bridge section 38 attached to each of the two lens sections 14 and extending there between across the nose region of the user. This bridge section 38 and the lens holding sections 14 are less narrow than flexible members 30 which are provided by wires having resiliency to hold the frame on the head of the user 18 (FIGS. 8 and 9). The wires of the flexible members 30 are flattened in temple sections 32 as shown in the side views of FIGS. 5 and 6. These wires are sufficiently narrow to provide flexibility during the donning and wearing of the frame 10 and enable the lenses 12 to be held in position on the head of the wearer 18 without movement or displacement so as to provide a comfortable fit without breaking the seal 26 of the mask 20 as shown in FIGS. 8 and 9.

Figure 1:
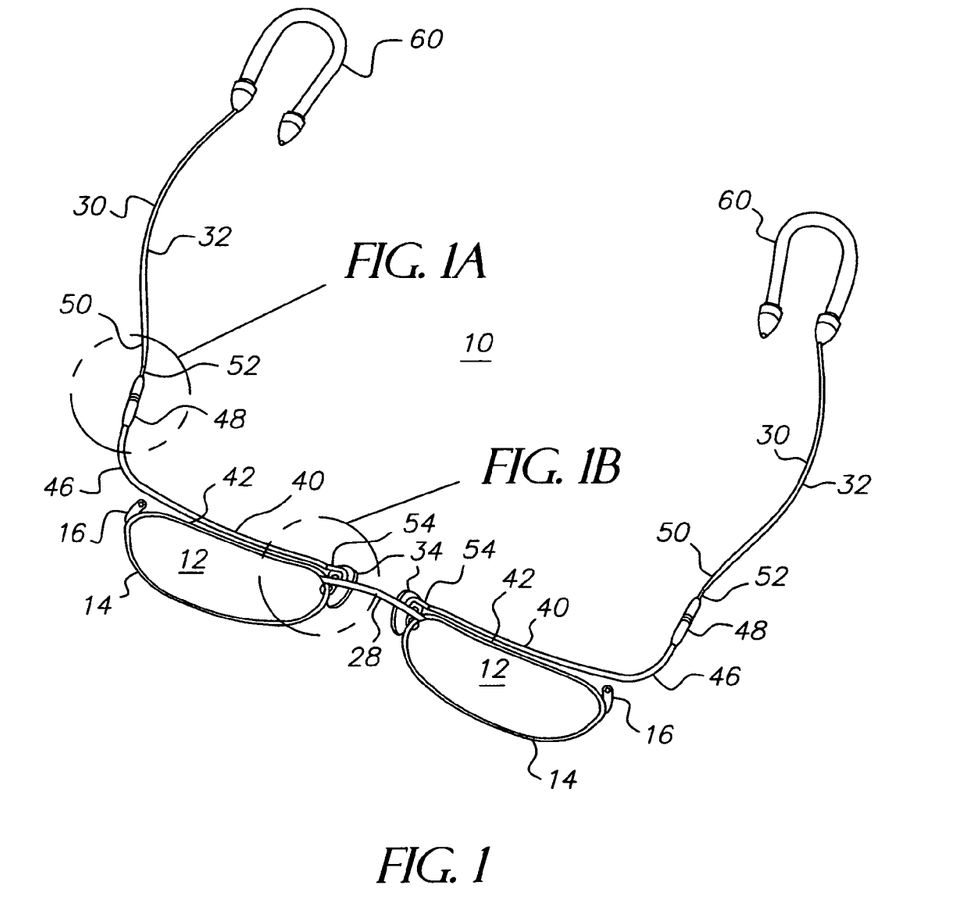
FIG. 1 is a perspective view looking downwardly from the right towards the top of eyewear embodying the invention.
Figure 1A:
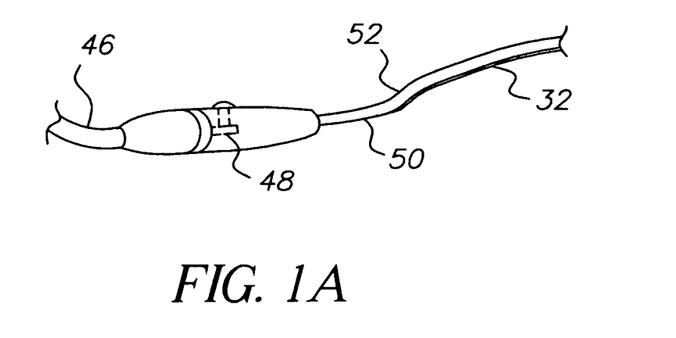
FIGS. 1A, 1B, 1C, and 1D are enlarged views of portions of the eyewear shown in FIG. 1 and in the top view thereof shown in FIG. 7 so as to illustrate different parts of the eyewear in greater detail, as such the views of FIGS. 1A, 1B, 1C, and 1D are perspective views of fragmentary portions of the eyewear, as shown in FIG. 1 or 7.
Figure 1B:
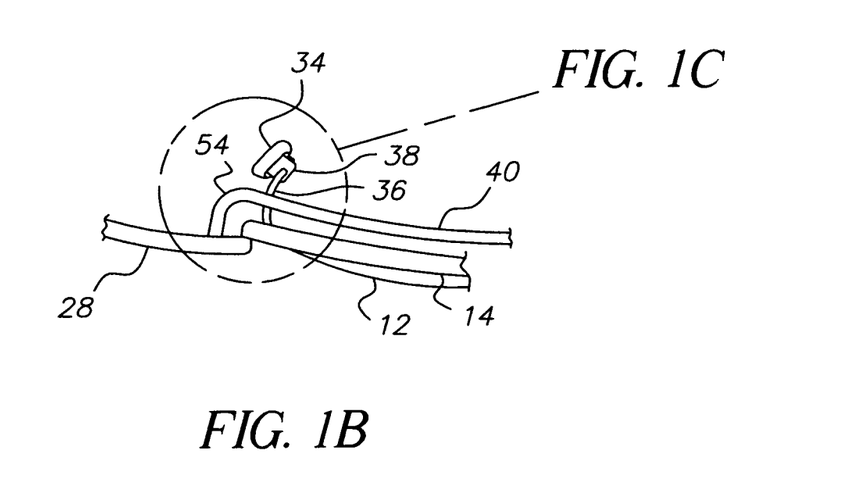
Figure 1C:
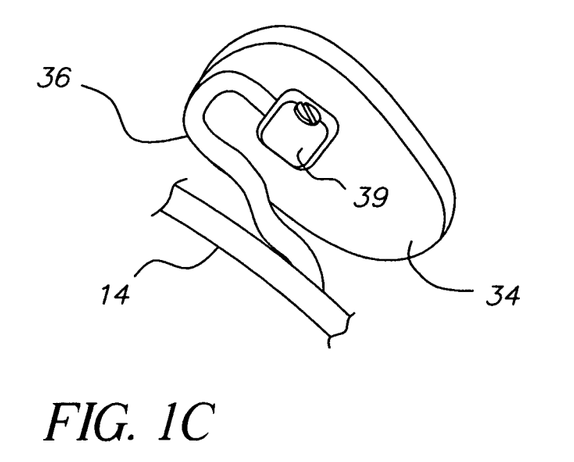
Figure 1D:
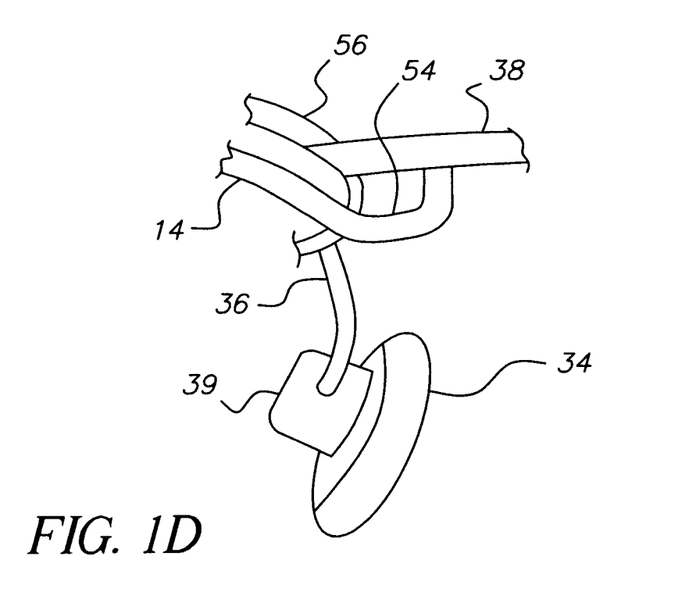

The frame 10 includes nose pads 34 which are also connected to lens holding sections 14 by wire loops 36 which are connected to the pads by screw clamps 39 (see FIGS. 1C and 1D).

The flexible members 30 have brow sections 40 which follow and conform to the brow and the upper edges 42 of the lens holding sections 14. The brow sections 40 at their outer ends 46 thereof, are bent approximately 90 degrees so that they extend rearwardly. The rearward of outer ends 46 are connected by way of hinge members 48 (see FIG. 1A) to the inside ends 50 of the temple sections 32 of flexible members 30.

This connection of the ends 50 provides a transition of the wire where it is round and then flattened in temple sections 30. This transition forms a kink 52 which lends itself to providing the requisite flexibility in the frame for comfort in wearing and placement on the head of the user (see especially FIG. 1A).

The inner ends 54 of the brow sections 40 are connected to the bridge section 38 via kink portions 56 (see FIG. 1D). These kink portions 56 as well as the curvature and flexibility of the brow sections 40 further enhance comfortable wearing of the frame on the head of the user by providing enhanced flexibility which would not otherwise be provided without the kink portions 56.

The inner ends 54 of the brow sections 40 are connected to the bridge section 38 via kink portions 56 (see FIG. 1B). These kink portions 56 as well as the curvature and flexibility of the brow sections 40 further enhance comfortable wearing of the frame on the head of the user by providing enhanced flexibility which would not otherwise be provided without the kink portions 56.

Figure 2:
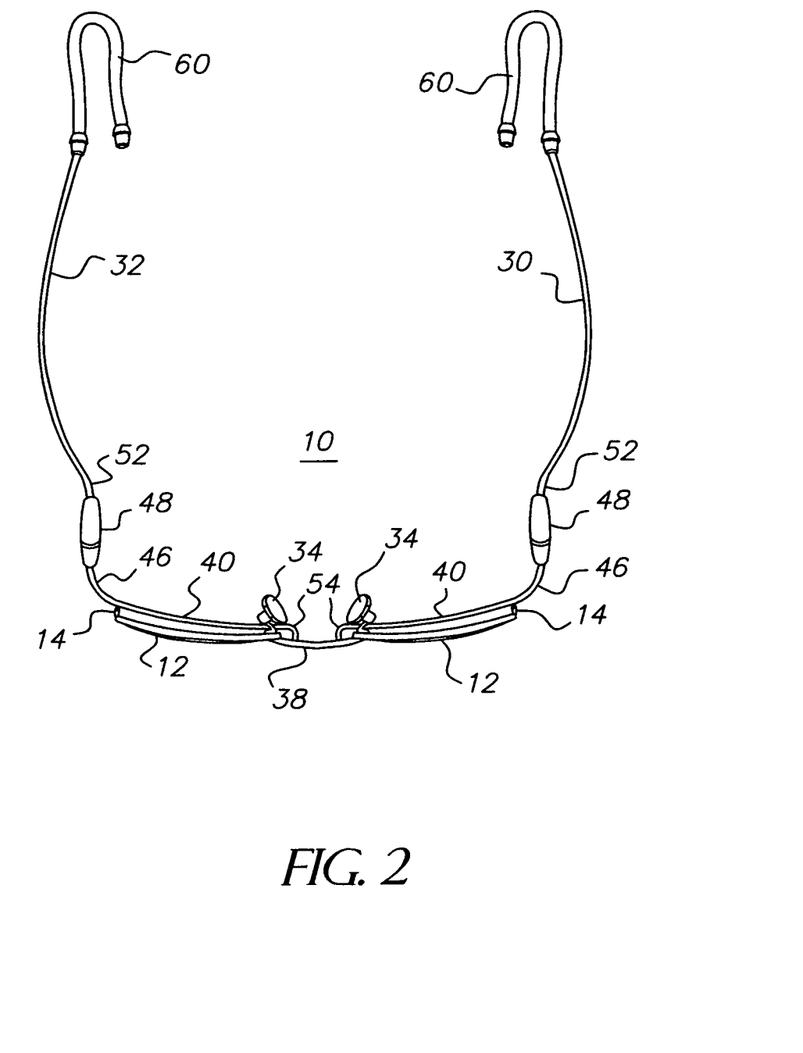
FIG. 2 is a bottom plan view of the eyewear shown in FIG. 1.
Figure 3:
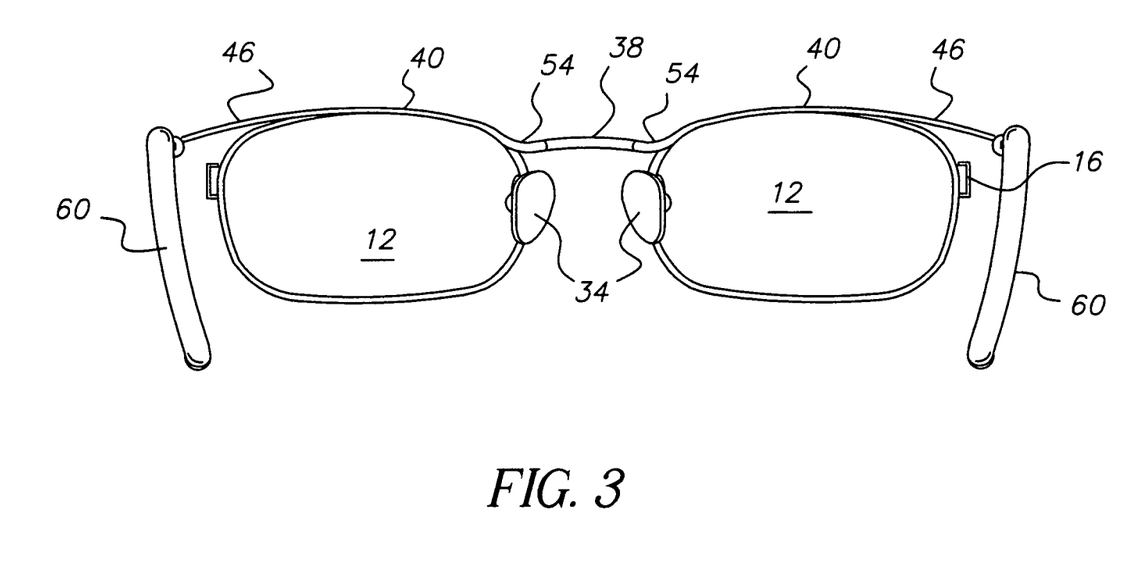
FIG. 3 is an elevational view taken from the rear of the eyewear shown in FIGS. 1 and 2.
Figure 4:
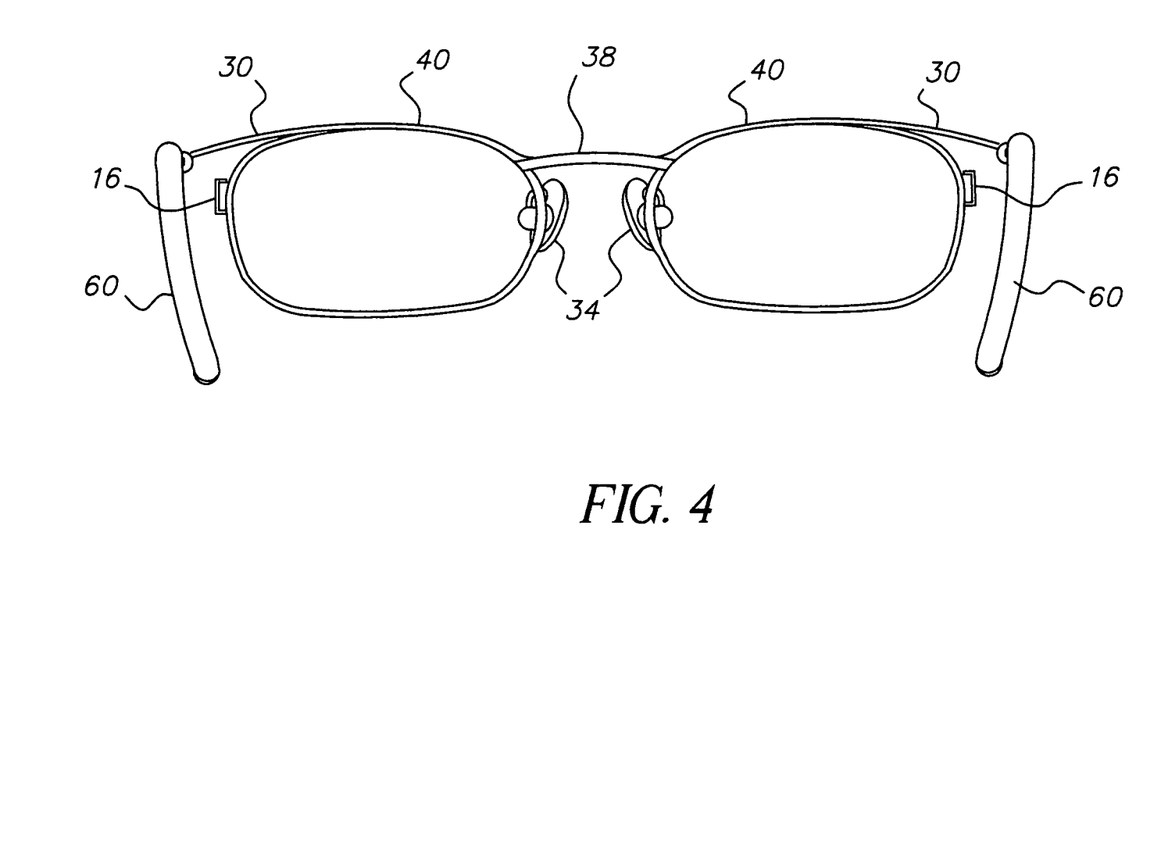
FIG. 4 is an elevational view similar to FIG. 3 but taken from the front of the eyewear.
Figure 5:
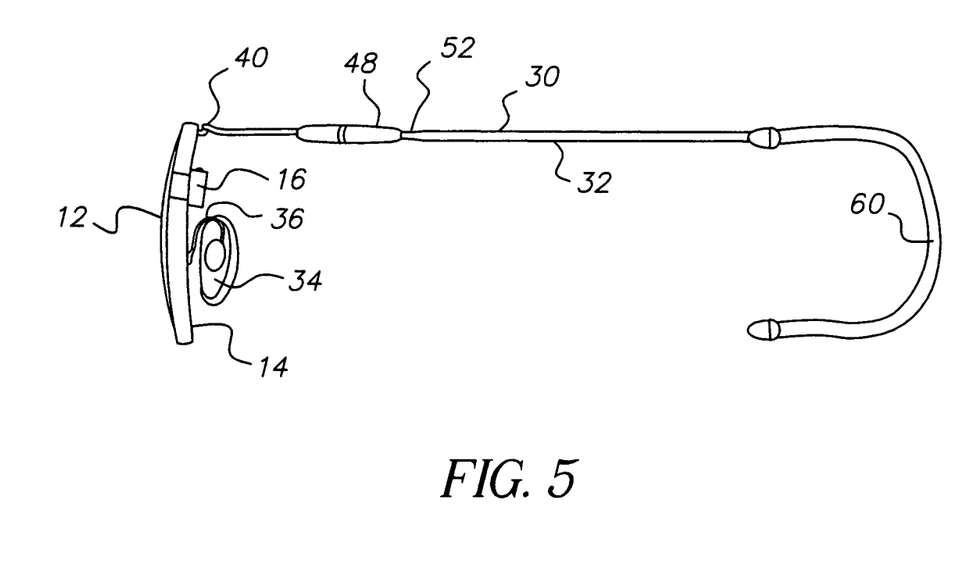
FIG. 5 is a right side elevational view of the eyewear of FIGS. 1-4.
Figure 6:
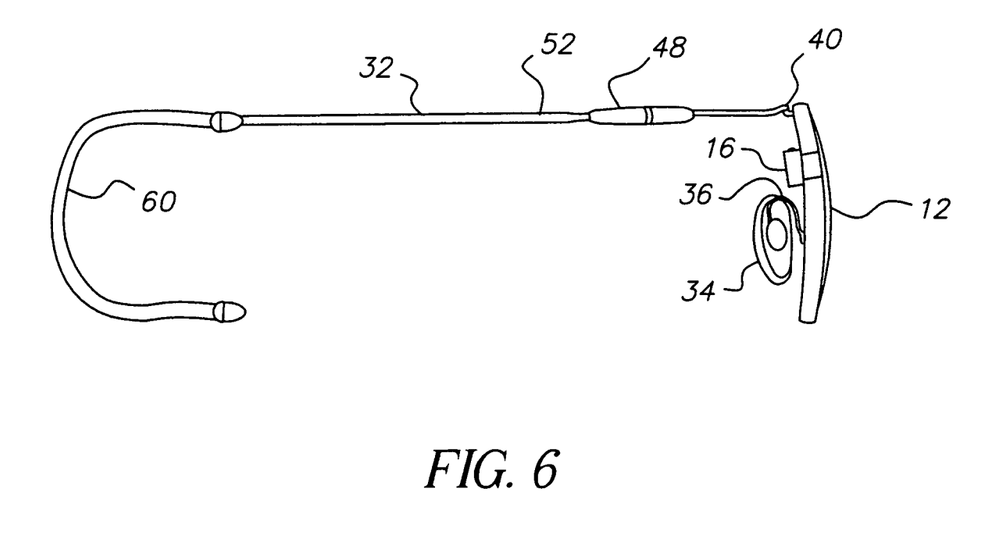
FIG. 6 is a left side elevational view of the eyewear shown in FIGS. 1-5.
Figure 7:
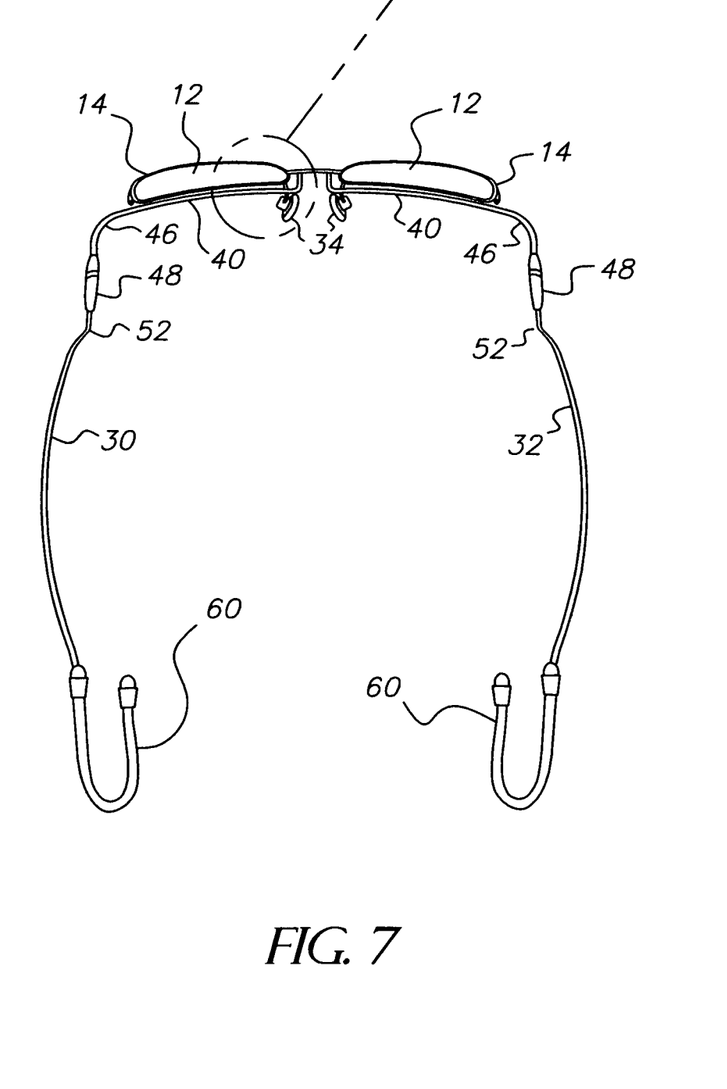
FIG. 7 is a top plan view of the eyewear shown in FIGS. 1-6.

As best shown in FIGS. 1, 2, and 7, the left and right flexible members 30 mirror each other along opposite sides of bridge section 38, and each of the left and right flexible members 30 comprise the left or right brow sections 40, respectively, and left or right temple sections 32, respectively, coupled by one of the hinges 48.

In summary, the eyewear frame 10 is suitable for routine wear and within masks having seals which enable the masks to prevent noxious environmental gases or penetration by water from being breathed, and are connected such as by a hose to a source of air or other breathing mixture, such as shown by connection 22. The frame 10 is made up of resilient metal parts including wires to provide the frame with a shape, which facilitates the placement of the eyewear on the head of the user while limiting the movement of the eyewear when in use so as to avoid breaking the seal of a mask inside of which the eyewear is disposed when the mask is donned by the user. In particular, the frame 10 has lens holding sections 14, and brow sections 40 that follow the shape of the eye and brow of the user at the upper edge of the sections 14. These lens holding sections 14 are connected to each other by a bridge section 38 which attaches to each of the two sections 14 and extends across the nose region of the user. Brow sections 30 are attached at their inner ends to the bridge section 38 and extend inwardly of the lenses and generally conform to the shape of the brow edges. The outer end of each brow section 40 turns rearwardly and attach to one of temple sections 32 of the frame 10 via a hinge 48.

The temple sections 32 each have a kink 52 along a transition 50 (i.e., round to flat) where the temple section is attached to hinge 48 so as to enable the temple section 32 to be bent outwardly along an arcuate curve which generally conforms to the shape of the sides of the user's head thereby facilitating passage of the temple section 32 toward the ears of the user without affecting the integrity of the seal of a mask when the eyewear is used in the mask. Preferably, the inner end of each of brow section 40 has a kink 54 near its attachment to bridge section 38 which enhances the flexible movement of the brow sections 40. This flexible movement facilitates placing the eyewear on the head of the user as well as restricting movement of the eyewear when worn by the user. Such flexibility also makes the eyewear comfortable when worn in routine use as well as inside a mask without interfering with the functioning of the mask.

From the foregoing description it will be apparent that there has been described herein improved eyewear especially adapted to be used with masks which seal against the head of the user and without interference with the seal when the mask is in place on the head of the user over the eyewear. Variations and modifications in the herein described eyewear, within the scope of the invention, will undoubtedly suggest themselves to those skilled in the art. Accordingly, the foregoing description should be taken illustratively, and not in a limiting sense.

What is claimed is:

1. Eyewear wearable on the head of a user and inside a mask without interference with the operation of the mask which eyewear comprises a lens holding frame for holding lenses adjacent to the eyes of the user's head with flexible members bent arcuately around and in conformance with the side of the head via a kink whereby to be accepted between the sides of the head and a seal of the mask and sufficiently tightly against the sides of the head to limit movement of the frame thereby avoiding the breaking of the seal, wherein said members extend inwardly along with the lenses toward a bridge between the lenses and being connected to the bridge via sections having further kinks which enhance the flexibility of the members.

2. The eyewear in accordance with claim 1 wherein said members are curved away from said further kinks along upper peripheries of said lenses in said frame to rearwardly bent portions of sections of said flexible members which are curved along the upper peripheries of the lenses and extend rearwardly from said lenses.

3. The eyewear in accordance with claim 2 wherein said bent portions each have a first straight portion and a second temple section which are hingedly connected to each other.

4. The eyewear in accordance with claim 3 wherein said bent portions are separate brow portions of said frame flexibly mounted via said further kinks to said bridge at said inside ends thereof and are curved outwardly toward said flexible members and connected thereto at one end thereof hingedly via hinges.

5. The eyewear in accordance with claim 4 wherein said flexible members provide temples of said frame and have curved resilient hooked ends for wrapping around the ears of the head of the user.

6. The eyewear in accordance with claim 3 wherein said temple section of each of said bent portions arcuately curve outwardly and further rearwardly from the straight portion of the bent portion along an arc conforming generally to a side of the wearer's head.

7. The eyewear in accordance with claim 1 wherein resilient metal parts provide said frame, the parts forming said kink transitioning from wires to flat sections, said flat sections providing said arcuately bent flexible members.

8. The eyewear in accordance with claim 7 wherein said metal is alloyed stainless steel or titanium sufficiently thin to be flexible to conform to and be yieldable with respect to brows of the user and the sides of the head of the user.

9. The eyewear in accordance with claim 1 wherein each of said flexible members has a hinge, and each of said flexible members are coupled to said lens holding frame and bend arcuately away from said lens holding frame to said hinge and then to said kink.

10. An eyewear frame comprising interconnected parts of resilient material including lens sections for encompassing and holding lenses, a bridge section interconnected between said lens sections, temple sections, brow sections connected to said bridge section and to said temple sections, said brow sections being disposed inwardly of said lens sections and being of a shape following the shape of said lens sections along the upper edges thereof and then curving inwardly to provide generally straight portions extending to the ends of said brow sections, said temple sections being connected to said ends of said portions, and having kinks at which said temples are arcuately curved outwardly and rearwardly along an arc conforming generally to the wearer's head along the sides thereof, wherein said brow sections are connected to said bridge section via kinked portions which provide flexibility for said brow sections.

11. The eyewear frame according to claim 10 wherein said temple sections transition from wires to flat shape at said kinks between the ends of said brow sections and said temples where said temples are arcuately curved.

12. The eyewear frame in accordance with claim 10 wherein said brow sections are wires which are of a diameter enabling said wires to be flexible when said eyewear is donned and in use by a wearer thereof.

13. The eyewear frame in accordance with claim 10 further comprising hinges at the ends of said portions of said brow sections and connected to said temple sections at inner ends thereof, said kinks being disposed following said hinges in a direction toward said temples.

14. The eyewear frame in accordance with claim 13 wherein said temple sections have hook portions at outer ends thereof which hook portions follow the temple sections where they are arcuately curved, said hook portions curving around the ears of the wearer and along the head of the wearer.

\* \* \* \* \*